United States Patent
Biler

(10) Patent No.: US 8,451,588 B2
(45) Date of Patent: May 28, 2013

(54) SOLID ELECTROLYTIC CAPACITOR CONTAINING A CONDUCTIVE COATING FORMED FROM A COLLOIDAL DISPERSION

(75) Inventor: Martin Biler, Novy Jicin (CZ)

(73) Assignee: AVX Corporation, Fountain Inn, SC (US)

( * ) Notice: Subject to any disclaimer, the term of this patent is extended or adjusted under 35 U.S.C. 154(b) by 300 days.

(21) Appl. No.: 13/045,581

(22) Filed: Mar. 11, 2011

(65) Prior Publication Data

US 2012/0229955 A1   Sep. 13, 2012

(51) Int. Cl.
*H01G 9/045* (2006.01)

(52) U.S. Cl.
USPC ........... 361/529; 361/516; 361/519; 361/523; 361/525; 361/528; 29/25.01; 29/25.03

(58) Field of Classification Search
USPC ............... 361/529, 516–519, 523–525, 528, 361/540, 541; 29/25.01–25.03
See application file for complete search history.

(56) References Cited

U.S. PATENT DOCUMENTS

| | | | |
|---|---|---|---|
| 2,453,103 | A | 11/1948 | Turnbill, Jr. |
| 3,345,545 | A | 10/1967 | Bourgault et al. |
| 4,945,452 | A | 7/1990 | Sturmer et al. |
| 5,111,327 | A | 5/1992 | Blohm et al. |
| 5,300,575 | A | 4/1994 | Jonas et al. |
| 5,344,902 | A | 9/1994 | Harwood et al. |
| 5,370,981 | A | 12/1994 | Krafft et al. |
| 5,457,862 | A | 10/1995 | Sakata et al. |
| 5,461,125 | A | 10/1995 | Lu et al. |
| 5,463,056 | A | 10/1995 | Jonas |
| 5,473,503 | A | 12/1995 | Sakata et al. |
| 5,519,147 | A | 5/1996 | Swager et al. |
| 5,729,428 | A | 3/1998 | Sakata et al. |
| 5,812,367 | A | 9/1998 | Kudoh et al. |
| 5,949,639 | A | 9/1999 | Maeda et al. |
| 6,028,155 | A | 2/2000 | Collins et al. |
| 6,191,936 | B1 | 2/2001 | Webber et al. |

(Continued)

FOREIGN PATENT DOCUMENTS

| | | |
|---|---|---|
| CZ | 301500 | 3/2010 |
| EP | 0440097 | 8/1991 |

(Continued)

OTHER PUBLICATIONS

Search Report for GB1202471.7 dated Jun. 15, 2012, 3 pages.

(Continued)

*Primary Examiner* — Nguyen T Ha
(74) *Attorney, Agent, or Firm* — Dority & Manning, P.A.

(57) ABSTRACT

A solid electrolytic capacitor that includes an anode body, a dielectric overlying the anode body, a solid electrolyte overlying the dielectric, and a colloidal particle coating that overlies the solid electrolyte. The coating is formed from a colloidal particle dispersion. The particles of the dispersion contain at least two different polymer components—i.e., a conductive polymer and a latex polymer. One benefit of such a coating is that the presence of the latex polymer can help mechanically stabilize the capacitor during encapsulation due to its relatively soft nature. This helps limit delamination of the solid electrolyte and any other damage that may otherwise occur during formation of the capacitor. Furthermore, the latex polymer can also enhance the ability of the particles to be dispersed in an aqueous medium, which is desirable in various applications.

25 Claims, 2 Drawing Sheets

U.S. PATENT DOCUMENTS

| | | | |
|---|---|---|---|
| 6,197,252 B1 | 3/2001 | Bishop et al. | |
| 6,197,878 B1 | 3/2001 | Murray et al. | |
| 6,322,912 B1 | 11/2001 | Fife | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,527,937 B2 | 3/2003 | Fife | |
| 6,528,662 B2 | 3/2003 | Jonas | |
| 6,576,099 B2 | 6/2003 | Kimmel et al. | |
| 6,580,601 B2* | 6/2003 | Hamada et al. | 361/523 |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,756,473 B2 | 6/2004 | Reuter et al. | |
| 6,852,830 B2 | 2/2005 | Groenendaal et al. | |
| 6,891,016 B2 | 5/2005 | Reuter et al. | |
| 6,927,298 B2 | 8/2005 | Groenendaal et al. | |
| 6,965,508 B2* | 11/2005 | Takatani et al. | 361/523 |
| 6,987,663 B2 | 1/2006 | Merker et al. | |
| 7,053,174 B2 | 5/2006 | Kirchmeyer et al. | |
| 7,094,865 B2 | 8/2006 | Groenendaal et al. | |
| 7,102,016 B2 | 9/2006 | Reuter | |
| 7,105,237 B2 | 9/2006 | Sotzing | |
| 7,116,548 B2 | 10/2006 | Satterfield, Jr. et al. | |
| 7,118,690 B2 | 10/2006 | Wessling et al. | |
| 7,154,740 B2 | 12/2006 | Merker et al. | |
| 7,220,397 B2 | 5/2007 | Kimmel et al. | |
| 7,262,511 B2 | 8/2007 | Osaka et al. | |
| 7,279,015 B2 | 10/2007 | Merker | |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,381,396 B2 | 6/2008 | Thomas et al. | |
| 7,411,779 B2 | 8/2008 | Merker et al. | |
| 7,419,926 B2 | 9/2008 | Schnitter et al. | |
| 7,438,832 B2 | 10/2008 | Majumdar et al. | |
| 7,449,588 B2 | 11/2008 | Jonas et al. | |
| 7,515,396 B2 | 4/2009 | Biler | |
| 7,569,158 B2 | 8/2009 | Waller et al. | |
| 7,578,859 B2 | 8/2009 | Reynolds et al. | |
| 7,580,246 B2* | 8/2009 | Takagi et al. | 361/525 |
| 7,585,983 B2 | 9/2009 | Reuter et al. | |
| 7,601,871 B2 | 10/2009 | Siggel et al. | |
| 7,641,807 B2 | 1/2010 | Siggel et al. | |
| 7,696,669 B2 | 4/2010 | Kudoh | |
| 7,714,124 B2 | 5/2010 | Scheibel et al. | |
| 7,736,398 B2 | 6/2010 | Tateishi et al. | |
| 7,745,520 B2 | 6/2010 | Shao et al. | |
| 7,750,099 B2 | 7/2010 | Chikusa et al. | |
| 7,754,053 B2 | 7/2010 | Maase | |
| 7,785,493 B2 | 8/2010 | Jonas et al. | |
| 7,820,737 B2 | 10/2010 | Kumacheva | |
| 7,826,200 B2* | 11/2010 | Pascenko | 361/523 |
| 7,867,291 B2* | 1/2011 | Petržilek et al. | 29/25.03 |
| 8,223,473 B2* | 7/2012 | Dreissig et al. | 361/505 |
| 2003/0215571 A1 | 11/2003 | Tahon et al. | |
| 2005/0065352 A1 | 3/2005 | Brassat et al. | |
| 2006/0180797 A1 | 8/2006 | Merker et al. | |
| 2007/0064376 A1 | 3/2007 | Merker et al. | |
| 2007/0139862 A1 | 6/2007 | Tateishi et al. | |
| 2008/0005878 A1 | 1/2008 | Merker et al. | |
| 2008/0210858 A1 | 9/2008 | Armstrong et al. | |
| 2008/0218942 A1 | 9/2008 | Yamagishi et al. | |
| 2009/0030149 A1 | 1/2009 | Morita et al. | |
| 2009/0296317 A1 | 12/2009 | Naoi et al. | |
| 2009/0310285 A1 | 12/2009 | Reuter et al. | |
| 2009/0318710 A1 | 12/2009 | Brassat et al. | |
| 2009/0320771 A1 | 12/2009 | Torres, Jr. et al. | |
| 2010/0084600 A1 | 4/2010 | Ahmad et al. | |
| 2010/0148124 A1 | 6/2010 | Reuter et al. | |
| 2011/0019339 A1 | 1/2011 | Merker et al. | |

FOREIGN PATENT DOCUMENTS

| | | |
|---|---|---|
| EP | 0626397 | 11/1994 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Related U.S. Patent Application Form.

Abstract of Article—Lee et al., "Electro-Conductive properties of poly(3,4-ethylenedioxythiophene)/poly(ionic liquid) films with respect to its structure and morphology," Synthetic Metal, vol. 159, Issues 23-24, Dec. 2009, pp. 2453-2457.

Abstract of Article—Pozo-Gonzalo et al., "PEDOT:Poly(1-vinyl-3-ethylimidazollum) dispersions as alternative materials for optoelectronic devices," Journal of Polymer Science, Part A: Polymer Chemistry, vol. 46, Issue 9, May 1, 2008 (Mar. 24, 2008), pp. 3150-3154.

Abstract of Article—Schachschal et al., "Growth of hydroxyapatite nanocrystals on polymer particle surface," *Colloid and Polymer Science*, vol. 285, No. 10, Jul. 2007, pp. 1175-1180.

Abstract of Article—Wen et al., "One-stage synthesis of narrowly dispersed polymeric core-shell microspheres," *Journal of Polymer Science Part A: Polymer Chemistry*, vol. 46, Issue 4, 2007, pp. 1192-1202.

Article—Cutler et al., "Alkoxysulfonate—Functionalized PEDOT Polyelectrolyte Multilayer Films: Electrochromic and Hole Transport Materials," Macromolecules, vol. 38, No. 8, 2005, pp. 3068-3074.

Article—Dai et al., "Emulsion Synthesis of Nanoparticles Containing PEDOT Using Conducting Polymeric Surfactant: Synergy for Colloid Stability and Intercalation Doping," *Journal of Polymer Science: Part A: Polymer Chemistry*, vol. 46, 2008, pp. 2536-2548.

Article—Graham et al., "Nanogels and microgels: The new polymeric materials playground," *Pure & Appl. Chem.*, vol. 70, No. 6, 1998, pp. 1271-1275.

Article—Groenendaal et al., "Poly(3,4-ethylenedioxythiophene) and Its Derivatives: Past, Present, and Future," Advanced Materials, vol. 12, No. 7, 2000, pp. 481-494.

Article—Kim et al., "Poly(3,4-ethylenedioxyth Derived from Poly(ionic liquid) for the Use as Hole-Injecting Material in Organic Light-Emitting Diodes," Macromolecular Rapid Communications, vol. 30, 2009, pp. 1477-1482.

Article—Han et al., "1-Dimensional structures of poly(3,4-ethylenedioxythiophene) (PEDOT): a chemical route to tubes, rods, thimbles, and belts," *Chem. Commun.*, 2005, pp. 3092-3094.

Article—Hain et al., "Electric Conductance of Films Prepared from Polymeric Composite Nanoparticles," Marcromol. Symp., vol. 268, 2008, pp. 61-65.

Article—Stéphan et al., "Electrochemical behaviour of 3,4-ethylenedioxythiophene functionalized by a sulphonate group. Application to the preparation of poly(3,4-ethylenedioxythiophene) having permanent cation-exchange properties," Journal of Electroanalytical Chemistry, vol. 443, 1998, pp. 217-226.

Article—Tran-Van et al., "Sulfonated polythiaphene and poly(3,4-ethylenedioxythiophene) derivatives with cations exchange properties," Synthetic Metals, vol. 142, 2004, pp. 251-258.

Article—Neil Winterton, "Solubilization of polymers by ionic liquids," J. Mater. Chem., vol. 16, 2006, pp. 4281-4293.

Article—Zotti et al., "Electrochemical and Chemical Synthesis and Characterization of Sulfonated Poly(3,4-ethylenedioxythiophene): Water-Soluble and Highly Conductive Conjugated Oligomer," Macromol. Chem. Phys., vol. 203, No. 13, 2002, pp. 1958-1964.

Product Information from Eastman™ for Acetoacetoxyethyl Methacrylat, 2008, 8 pages.

Product Information from Strem Chemicals, Inc. on Ionic Liquids, 2008, 2 pages.

Thesis—Jennifer Nicole DeCerbo, 1-Alkyl-3-Methylimidazolium Bis(pentafluoroethylsulfonyl)imide Based Ionic Liquids: A Study of Their Physical and Electrochemical Properties, Wright State University, 2008, 12 pages.

* cited by examiner

SOLID ELECTROLYTIC CAPACITOR CONTAINING A CONDUCTIVE COATING FORMED FROM A COLLOIDAL DISPERSION

BACKGROUND OF THE INVENTION

Solid electrolytic capacitors (e.g., tantalum capacitors) have been a major contributor to the miniaturization of electronic circuits and have made possible the application of such circuits in extreme environments. Conventional solid electrolytic capacitors are often formed by pressing a metal powder (e.g., tantalum) around a metal lead wire, sintering the pressed part, anodizing the sintered anode, and thereafter applying a solid electrolyte. The solid electrolyte layer may be formed from a conductive polymer (e.g., poly(3,4-ethylenedioxythiophene)), such as described in U.S. Pat. Nos. 5,457,862 to Sakata, et al., 5,473,503 to Sakata, et al., 5,729, 428 to Sakata, et al., and 5,812,367 to Kudoh, et al. The conductive polymer electrolyte of these capacitors has traditionally been formed through sequential dipping into separate solutions containing the ingredients of the polymer layer. For example, the monomer used to form the conductive polymer is often applied in one solution, while the catalyst and dopant is applied in a separate solution or solutions. One problem with this technique, however, is that it is often difficult and costly to achieve a relatively thick solid electrolyte, which is helpful for achieving good mechanical robustness and electrical performance. Also, such polymers can also delaminate from the part during encapsulation of the capacitor, which adversely impacts electrical performance. Various attempts have been made to address this problem. U.S. Pat. No. 6,987, 663 to Merker, et al., for instance, describes the use of a polymeric outer layer that covers a surface of the solid electrolyte. Unfortunately, this technique is still problematic in that it is difficult to achieve good adhesion of the polymeric outer layer to the graphite/silver layer often used in terminating the solid electrolyte capacitor. Further, it is difficult to disperse such polymeric layers in aqueous mediums, which is desired in certain applications.

As such, a need remains for a solid electrolytic capacitor that possesses good mechanical robustness and electrical performance.

SUMMARY OF THE INVENTION

In accordance with one embodiment of the present invention, a solid electrolytic capacitor is disclosed that comprises an anode body, a dielectric overlying the anode body, a solid electrolyte that overlies that dielectric, and a colloidal particle coating that overlies the solid electrolyte. The coating is formed from a colloidal dispersion of particles that contain at least one conductive polymer and at least one latex polymer.

In accordance with another embodiment of the present invention, a method of forming a solid electrolytic capacitor is disclosed. The method comprises anodically oxidizing an anode body; applying a solid electrolyte to the anodically oxidized anode body; and thereafter, applying a colloidal particle coating over the solid electrolyte. The colloidal particle coating is formed from a colloidal dispersion of particles that contain at least one conductive polymer and at least one latex polymer.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
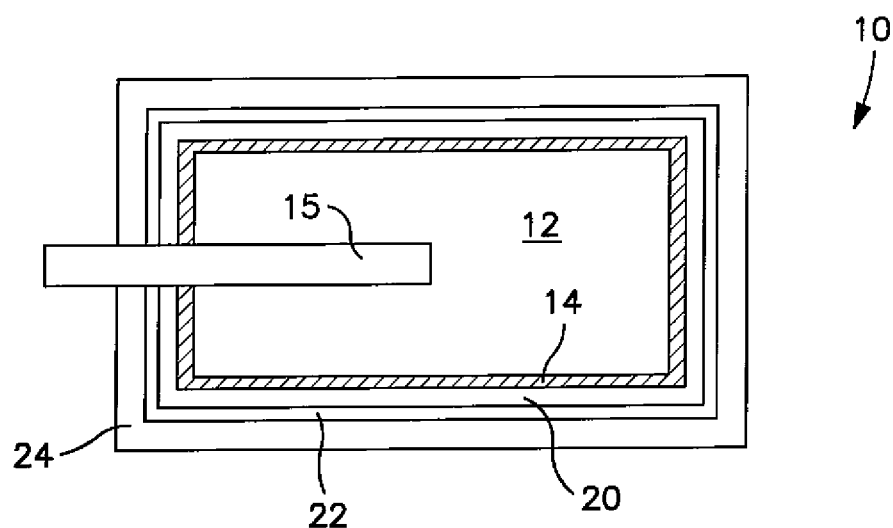
FIG. 1 is a cross-sectional view of one embodiment of the solid electrolytic capacitor of the present invention.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor that includes an anode body, a dielectric overlying the anode body, a solid electrolyte overlying the dielectric, and a colloidal particle coating that overlies the solid electrolyte. The coating is formed from a colloidal particle dispersion. The particles of the dispersion contain at least two different polymer components—i.e., a conductive polymer and a latex polymer. One benefit of such a coating is that the presence of the latex polymer can help mechanically stabilize the capacitor during encapsulation due to its relatively soft nature. This helps limit delamination of the solid electrolyte and any other damage that may otherwise occur during formation of the capacitor. Furthermore, the latex polymer can also enhance the ability of the particles to be dispersed in an aqueous medium, which is desirable in various applications.

Various embodiments of the present invention will now be described in more detail.

I. Anode Body

The anode body may be formed from a valve metal composition having a high specific charge, such as about 40,000 μF*V/g or more, in some embodiments about 50,000 μF*V/g or more, in some embodiments about 60,000 μF*V/g or more, and in some embodiments, from about 70,000 to about 700, 000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. Nos. 6,322,912 to Fife; 6,391,275 to Fife et al.; 6,416,730 to Fife et al.; 6,527,937 to Fife; 6,576, 099 to Kimmel, et al.; 6,592,740 to Fife, at al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

If desired, an anode lead may also be attached to the anode body. The anode lead may be in the form of a wire, sheet, etc., and may be formed from a valve metal compound, such as tantalum, niobium, niobium oxide, etc. Attachment of the lead may be accomplished using known techniques, such as by welding the lead to the body or embedding it within the anode body during formation.

II. Dielectric

The anode body may be anodized so that a dielectric is formed over and/or within the anode. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Solid Electrolyte

As indicated above, a solid electrolyte overlies the dielectric that generally functions as the cathode for the capacitor. The solid electrolyte may be formed from a variety of materials known in the art, such as inorganic materials (e.g., manganese dioxide) or organic materials (e.g., conductive polymers, 7,7',8,8'-tetracyanoquinodimethane ("TCNQ") complexes, etc.). In one particular embodiment, a conductive polymer is employed as the solid electrolyte. Typically, such conductive polymer(s) are π-conjugated and have an intrinsic electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth.

Particularly suitable conductive polymers are substituted polythiophenes, such as described in more detail below. Such substituted polythiophenes may be formed from a thiophene monomer that is chemically polymerized in the presence of an oxidative catalyst. The oxidative catalyst may be a transition metal salt, such as a salt of an inorganic or organic acid that contain ammonium, sodium, gold, iron(III), copper(II), chromium(VI), cerium(IV), manganese(IV), manganese (VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron (III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

If desired, polymerization of the monomer may occur in a precursor solution. Solvents (e.g., polar protic or non-polar) may be employed in the solution, such as water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. When employed, the total amount of solvents in the precursor solution may be from about 40 wt. % wt. % to about 90 wt. %, in some embodiments from about 50 wt. % to about 85 wt. %, and in some embodiments, from about 60 wt. % to about 80 wt. %.

Polymerization of the thiophene monomer generally occurs at a temperature of from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

Various methods may be utilized to apply the solid electrolyte onto the anode part. In one embodiment, the oxidizing agent and monomeric precursor are applied, either sequentially or together, such that the polymerization reaction occurs in situ on the part. Suitable application techniques may include screen-printing, dipping, electrophoretic coating, and spraying, may be used to form a conductive polymer coating. As an example, the monomeric precursor (e.g., 3,4-ethylenedioxy-thiophene) may initially be mixed with the oxidizing agent to form a solution. One suitable oxidizing agent is CLEVIOS™ C, which is iron III toluene-sulfonate. CLEVIOS™ C is a commercially available catalyst for CLEVIOS™ M, which is 3,4-ethylene dioxythiophene, a PEDT monomer. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

In addition to in situ application, the solid electrolyte may also be applied to the part in the form of a dispersion of pre-polymerized solid conductive polymer particles. Although their size may vary, it is typically desired that the particles possess a small diameter to increase the surface area available for adhering to the anode part. For example, the particles may have an average size of from about 1 to about 200 nanometers, in some embodiments from about 2 to about 100 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

If desired, the solid electrolyte may be formed from one or multiple layers. Regardless of the number of layers employed, the solid electrolyte may optionally be healed upon application to the anode part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

IV. Colloidal Particle Coating

As indicated above, the capacitor also contains a colloidal particle coating that is generally conductive. The particles of the coating include at least two different polymer components—i.e., a conductive polymer and a latex polymer. Latex polymers suitable for use in the colloidal dispersion are typically produced by emulsion polymerization of one or more monomers in the presence of initiators, surfactants, etc. within the dispersion medium (e.g., water). Emulsion polymerization may occur in a single stage process or a process involving several stages. The monomers that are used to form the latex polymers may be ethylenically unsaturated monomers. Monoethylenically unsaturated monomers are particularly useful in the present invention.

In one particular embodiment, the latex polymer is a copolymer formed from two or more nonionic, monoethylenically unsaturated monomers. One suitable type of such monomers are nonionic monomers that do not contain an active functional group, such as styrene, α-methyl styrene, p-methyl styrene, t-butyl styrene, and so forth. Of course, nonionic monomers that do contain at least one functional group (e.g., hydroxyl, carboxyl, amide, amine, etc.) may also be employed in the present invention. One benefit of such functional monomers is that they can undergo further reaction during emulsion polymerization. Exemplary functional nonionic monomers may include (meth)acrylates, such as methyl (meth)acrylate, ethyl(meth)acrylate, butyl(meth)acrylate, isobutyl (meth)acrylate, ethyhexyl(meth)acrylate, octyl (meth)acrylate, isooctyl (meth)acrylate, allyl(meth)acrylate, diallyl(meth)acrylate, isopropenyl (meth)acrylate, etc.; hydroxy(meth)acrylates, such as hydroxybutenyl (meth) acrylate, etc.; alkoxy(meth)acrylates, such as such as acetoacetoxy ethyl (meth)acrylate, methoxybutenyl(meth)acrylate, etc.; (meth)acrylamides, such as ethyl(meth)acrylamide, (meth)acrylamide, N-n-octyl acrylamide, N-t-butyl acrylamide, N-(3-dimethylaminopropyl) (meth)acrylamide, N-(3-dimethylamino-2,2-dimethylpropyl) (meth)acrylamide, N-dimethylaminomethyl(meth)acrylamide, N-dimethylaminoethyl(meth)acrylamide, N-(4-morpholinomethyl) (meth) acrylamide, N,N-dimethyl(meth)acrylamide, N,N-diethyl (meth)acrylamide, N-vinyl caprolactam, etc.; aminoalkyl (meth)acrylates, such as dimethylaminoethyl(meth)acrylate, diethylaminoethyl(meth)acrylate, dimethylaminopropyl (meth)acrylate, 3-dimethylamino-2,2-dimethylpropyl-1 (meth)acrylate, 2-N-morpholinoethyl(meth)acrylate, 2-N-piperidinoethyl (meth)acrylate, etc.; pyrrolidones, such as N-vinyl pyrrolidone, N-acryloxyethyl pyrrolidone, etc.; and so forth, as well as mixtures of any of the foregoing. As used herein, the term "(meth)acrylate" encompasses both acrylates and methacrylates and the term "(meth)acrylamide" encompasses both acrylamides and methacrylamides. Particularly suitable copolymers for use in the present invention include poly(styrene-co-acetoacetoxy ethyl methacrylate) and poly [(styrene-co-ethylene glycol)methacrylate].

Of course, the latex polymer may also contain other monomer components, such as a polyethylenically unsaturated monomer. Suitable polyethylenically unsaturated monomers include comonomers containing at least two addition polymerizable vinylidene groups and are ethylenically unsaturated monocarboxylic acid esters of polyhydric alcohols containing 2-6 ester groups. Such comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl(meth)acrylates; dicyclopentenyloxy(meth)acrylates; unsaturated esters of glycol monodicyclopentenyl ethers; allyl esters of α, β-unsaturated mono- and dicarboxylic acids having terminal ethylenic unsaturation including allyl methacrylate, allyl acrylate, diallyl maleate, diallyl fumarate, diallyl itaconate, and so forth.

Various additives may also be employed to form the latex polymer via emulsion polymerization. For instance, initiators may be employed, such as salts of persulfates, water or diol soluble organic peroxides and azo type initiators. More particularly, suitable initiators may include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and mixtures thereof. Redox initiation systems, such as iron catalyzed reaction of t-butyl hydroperoxide with isoascorbic acid, are also useful. Reducing agents may also be used in the emulsion polymerization. Suitable reducing agents are those that increase the rate of polymerization and include, for example, sodium bisulfite, sodium hydrosulfite, sodium formaldehyde sulfoxylate, sodium phosphomolybdate, ascorbic acid, isoascorbic acid, etc. Buffering agents may also be used in emulsion polymerization to control the pH of the reaction. Suitable buffering agents include, but are not limited to, ammonium and sodium salts of carbonates and bicarbonates. Polymerization catalysts may also be used in the emulsion polymerization that increase the rate of polymerization and which, in combination with the above described reducing agents, may promote decomposition of the polymerization initiator under the reaction conditions. Suitable catalysts include, but are not limited to, transition metal compounds such as, for example, ferrous sulfate heptahydrate, ferrous chloride, cupric sulfate, cupric chloride, cobalt acetate, cobaltous sulfate, and mixtures thereof.

The latex polymers of the invention may be uncrosslinked or crosslinked. When crosslinked, the resulting particle is sometimes referred to as a "microgel particle", e.g., macromolecules that are intramolecularly crosslinked. To this end, crosslinking agents may be employed, such as multifunctional unsaturated compounds including, but not limited to, divinyl benzene, allyl methacrylate, allyl acrylate, multifunctional acrylates and mixtures thereof. Suitable multifunctional acrylates include, but are not limited to, ethylene diol dimethacrylate, ethylene diol diacrylate, trimethylolpropane triacrylate, trimethylolpropane trimethacrylate, pentaerythritoltetraacrylate and mixtures thereof. The amount of the crosslinking monomer in the emulsion polymerization can be controlled to vary the gel fraction of the latex from 20 to 100 percent. The gel fraction is the amount that will not dissolve in the solvent.

As stated above, the colloidal particle coating also includes a conductive polymer. Although the actual amount may vary depending on the material employed and the morphology of the particles, conductive polymer(s) typically constitute from about 0.5 to about 30 wt. %, in some embodiments from about 1 to about 25 wt. %, and in some embodiments, from about 2 to about 15 wt. % of the dispersion. At such concentrations, the conductive polymer can impart the desired degree of conductivity to the dispersion. The conductive polymer is typically π-conjugated and has electrical conductivity after oxidation or reduction, such as an electrical conductivity of at least about 1 μS/cm after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

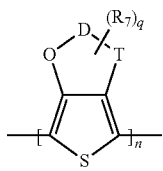

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

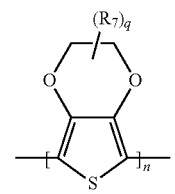

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

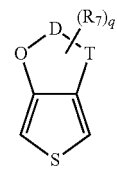

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

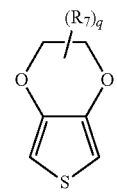

wherein, $R_7$ and q are as defined above. In one particular embodiment, "q" is 0. One commercially suitable example of 3,4-ethylenedioxthiophene is available from H.C. Starck GmbH under the designation CLEVIOS™ M. Other suitable monomers are also described in U.S. Pat. Nos. 5,111,327 to Blohm, et al. and 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

To produce the colloidal particle coating, monomeric precursors of the conductive polymer, such as described above, typically undergo oxidative polymerization in the presence of an oxidizing agent, such as described above. Oxidative polymerization generally occurs in the presence of the latex polymer. During such oxidative polymerization, the latex polymer may be initially dispersed within a liquid medium, which typically includes water. A secondary solvent may also be employed to form a solvent mixture to increase the solubility of the conductive polymer in the dispersion medium. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 20 wt. % to about 80 wt. %, in some embodiments from about 30 wt. % to about 70 wt. %, and in some embodiments, from about 40 wt. % to about 60 wt. % and secondary solvent(s) in an amount from about 20 wt. % to about 80 wt. %, in some embodiments from about 30 wt. % to about 70 wt. %, and in some embodiments, from about 40 wt. % to about 60 wt. %.

The oxidizing agent and monomeric precursor may be applied to the dispersion medium sequentially or together. As an example, the monomeric precursor (e.g., 3,4-ethylenedioxy-thiophene) may initially be mixed with the dispersion medium (e.g., water/ethanol) and then applied with latex particles. The resulting mixture may then be applied with an oxidizing agent. Polymerization may be performed at temperatures of from about −10° C. to about 250° C., and in some embodiments, from about 0° C. to about 150° C., depending on the oxidizing agent used and desired reaction time.

Figure 2:
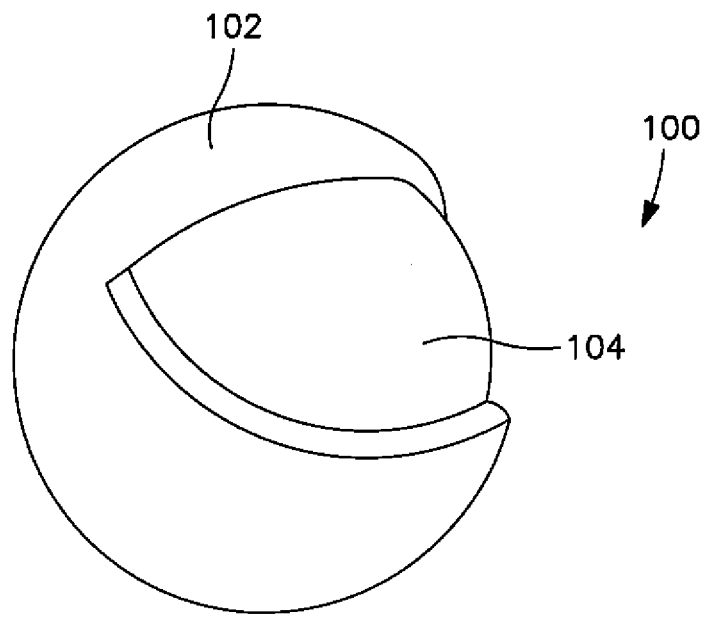
FIG. 2 is an exploded, schematic illustration of one embodiment of a "core-shell" particle morphology that may be employed in the present invention.
Figure 3:
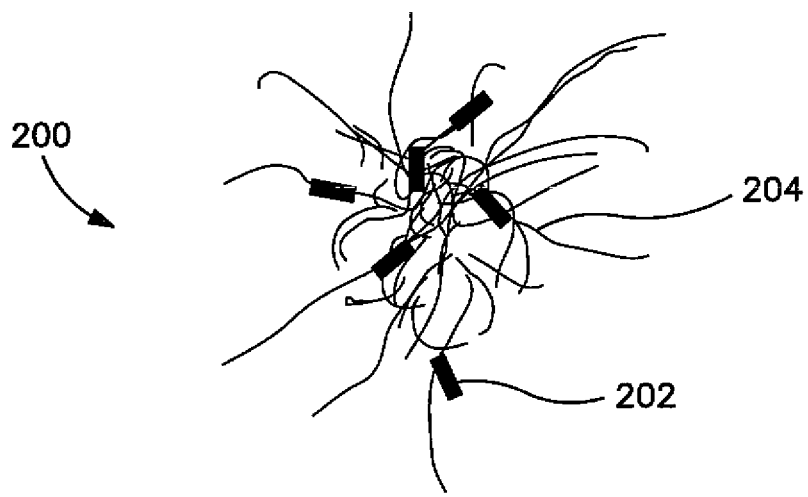
FIG. 3 is a schematic illustration of one embodiment of a microgel particle morphology that may be employed in the present invention.

Upon their formation, the conductive polymer is generally located at or near the surface of the particles and thereby enhances the overall conductivity of the dispersion. Moreover, the latex polymer, which is not generally electrically charged, is contained primarily within the interior structure of the particles and thus does not substantially inhibit conductivity. Notwithstanding the above, various particle morphologies may be employed to achieve the desired properties of the dispersion. In one embodiment, for example, core-shell particles are formed in which the latex polymer ("core") is coated by the conductive polymer ("shell"). Referring to FIG. 2, for example, one embodiment of this morphology is shown. More specifically, a particle 100 is shown that includes an outer shell 102 formed of a thiophene polymer (e.g., poly(3,4-dioxythiophene)) and an inner core 104 formed of a latex polymer (e.g., poly[(styrene-co-ethylene glycol)methacrylate]). In other embodiments, however, the particle may have a composite morphology in which the latex polymer is crosslinked to form a microgel. In such embodiments, the conductive polymer may be in the form of rods, belts, etc. that at are incorporated into the gel structure. Referring to FIG. 3, for example, one embodiment of this morphology is shown. More specifically, a composite particle 200 is shown that includes rods 202 of a thiophene polymer (e.g., poly(3,4-dioxythiophene)) that are incorporated into a crosslinked network or "microgel" 204 of the latex polymer (e.g., poly[(styrene-co-ethylene glycol)methacrylate]).

The particles of the colloidal dispersion are usually small, such as having an average diameter of from about 1 to about 700 nanometers, in some embodiments from about 10 to about 600 nanometers, and in some embodiments, from about 50 to about 500 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Once formed, various methods may be utilized to apply the colloidal dispersion to an anode body, such as by spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPas (measured at a shear rate of 100 s$^{-1}$, in some embodiments from about 1 to about 10,000 mPas, in some embodiments from about 10 to about 1,500 mPas, and in some embodiments, from about 100 to about 1000 mPas. Once applied, the layer may be dried and washed.

V. Other Layers

The capacitor of the present invention may optionally contain other layers in addition to those noted above. For example, an external coating may be employed that overlies colloidal particle coating. For example, the external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 µm to about 50 µm, in some embodiments from about 2 µm to about 30 µm, and in some embodiments, from about 5 µm to about 10 µm. Likewise, the thickness of the metal layer is typically within the range of from about 1 µm to about 100 µm, in some embodiments from about 5 µm to about 50 µm, and in some embodiments, from about 10 µm to about 25 µm.

Referring again to FIG. 1, one particular embodiment of a solid electrolytic capacitor 10 is shown that includes a dielectric 14 that overlies an anode body 12, which is embedded with a lead 15. Although not specifically illustrated, the dielectric 14 generally coats the exterior surface of the anode body 12 and is also present within its interior pore structure. A solid electrolyte 20 is formed that overlies the dielectric 14. Further, the aforementioned colloidal dispersion is applied to the capacitor to form a colloidal particle coating 22 that overlies the solid electrolyte 20. An external coating 24 is also shown that contains a carbonaceous layer and a silver layer (not separately shown). It should be understood that the use of the term "overlies" herein means simply that the particular coating or layer is applied after the preceding layer. Some portion of such coating or layer may, however, intermix or flow through the preceding layer such that the coating or layer does not strictly cover the entire preceding coating or layer. For example, some portion of the colloidal particle coating may pass into the pores of the anode where no solid electrolyte is located. Nevertheless, the coating still overlies the solid electrolyte.

The electrolytic capacitor of the present invention may also contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Once the capacitor element is attached, the lead frame may be enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

The present invention may be better understood by reference to the following examples.

Test Procedures

Equivalent Series Resistance (ESR)

Equivalence series resistance was measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance(CAP)

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current (DCL)

Leakage current was measured using a leakage test set that measures leakage current at a temperature of 25° C. and at the rated voltage after a minimum of 30 seconds.

Temperature/Pressure Test

Certain electrical properties were determined after temperature and pressure testing. More particularly, 100 samples were put into a pressure cooker filled with water for 100 hours at 125° C. The samples were then tested in the manner described above.

EXAMPLE 1

Particles were initially formed from poly[(styrene-co-ethylene glycol)methacrylate]. ("PS-PEGMA"). The particles were formed by surfactant-free emulsion polymerization of styrene in presence of poly[(ethylene glycol)methacrylate]. The particles consisted of a compact hydrophobic polystyrene-rich core and hydrophilic PEGMA-rich swollen shell. The particle size of PS-PEGMA was controlled by fleet-ratio ($W_p/W_m$), wherein $W_p$ is the macroscopic weight of the PEGMA ($W_p$) and $W_m$ is the weight of the PS. More particularly, the quantitative relationship between particle size and the fleet-ratio for a surfactant-free macromonomer/monomer emulsion is described in Wu, et al. (*Macromolecules* 27. 1994; 298) and recited below:

$$\left\{\frac{R_h W_p}{W_m + W_p}\right\}^{1/2} = \left[s\frac{N_A \rho}{3M_p}\right]^{-1/2}\left(1 - \frac{b}{2R_h}\right)$$

where $R_h$ is the hydrodynamic radius of the particles, $N_A$ is Avogadro's constant, ρ is the average density of the microspheres, $M_p$ is the molar mass of the stabilizer and b is the thickness of the stabilizer shell layer. Applying Wu's model, the particles of Example 1 had a hydrodynamic radius ($R_h$) of 162 nanometers.

EXAMPLE 2

40 grams of the PS-PEGMA dispersion of Example 1 was diluted with 160 grams of deionized water and placed into a stirred reactor. Thereafter, 0.2 grams of 3,4-ethylenedioxythiophene monomer (CLEVIOS™ M) was injected into the dispersion using a syringe, and the resulting mixture was stirred for 15 minutes at ambient conditions. A butanol solution of oxidizer/dopant-iron(III) tosylate (CLEVIOS™ C) was added dropwise to start polymerization. After a few minutes, dispersion became colored which indicated that the polymerization had started. After 6 hours, composite particles were formed and removed from the reaction vessel. The composite particles were washed by ultrafiltration to remove non-reacted monomer and all by-products. Poly(3,4-ethylenedioxythiophene) ("PEDT") was thus deposited onto the PS-PEGMA particle surface by oxidative polymerization directly in presence of pre-formed polymeric cores. The amount of the PEDT deposition was determined by elementary analysis and determined to be 4.3% by weight onto PS-PEGMA particles (theoretical value was calculated to 5.0%; yield of reaction was 86%).

EXAMPLE 3

A tantalum anode with a size of 1.70 mm×1.05 mm×2.4 mm was anodized at 13.5V in a liquid electrolyte (aqueous solution of orthophosphoric acid) to 100 µF. A solid electrolyte was then formed by dipping the anode into a butanol solution of iron(III) tosylate (Clevios™ C) for 5 minutes and consequently into 3,4-ethylenedioxythiophene (Clevios™ M) for 1 minute. After 45 minutes of polymerization, a layer of poly(3,4-ethylenedioxythiophene) was formed on the surface of the dielectric. The parts were washed in methanol to remove reaction by-products, re-anodized in a liquid electrolyte (aqueous solution of 4-toluene sulfonic acid), and washed again in methanol. The polymerization cycle was repeated 4 times. Thereafter, the part was dipped into the PS-PEGMA/PEDT particle dispersion of Example 2, which had a solids content of 1%. The part was then dried at 125° C. for 20 minutes. Once again, this process was repeated 2 times. The parts were then coated by graphite and silver, and assembled by gluing the anodes into a leadframe pocket, cutting and laser welding the anode wire into the leadframe upstand, and molding the capacitor. Multiple parts (500 samples) were made in this manner for testing.

EXAMPLE 4

500 pieces of capacitors were prepared as described in Example 3, except that Clevios™ K (solids content of 1%) was used to form the conductive polymer coating rather than the PS-PEGMA/PEDT particles used in Example 3. The finished capacitors of Examples 3 and Example 4 were then tested for electrical performance. The median results are set forth below in Table 1.

TABLE 1

| | Initial Electrical Properties | | |
| --- | --- | --- | --- |
| | DCL [µA] | ESR [mΩ] | CAP [µF] |
| Example 3 | 8.3 | 78 | 92.4 |
| Example 4 | 48.5 | 75 | 91.3 |

100 samples of the finished capacitors of Example 3 and Example 4 were also tested after "temperature/pressure" testing as described above. The results are shown below in Table 2.

TABLE 2

| | Electrical Properties after Temperature/Pressure Testing | | |
| --- | --- | --- | --- |
| | DCL [µA] | ESR [mΩ] | Cap [µF] |
| Example 3 | 3.2 | 80 | 98.3 |
| Example 4 | 12.9 | 79 | 98.0 |

As indicated in the results above, the leakage current of Example 3 was substantially lower than that of Example 4, before and after temperature/pressure testing.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
an anode body;
a dielectric overlying the anode body;
a solid electrolyte that overlies the dielectric; and
a colloidal particle coating overlying the solid electrolyte, wherein the coating is formed from a colloidal dispersion of particles, wherein the particles contain at least one conductive polymer and at least one latex polymer.

2. The solid electrolytic capacitor of claim 1, wherein the latex polymer is formed from at least one monoethylenically unsaturated monomer.

3. The solid electrolytic capacitor of claim 2, wherein the monomer includes styrene, α-methyl styrene, p-methyl styrene, t-butyl styrene, or a combination thereof.

4. The solid electrolytic capacitor of claim 2, wherein the monomer includes a functional monomer, the functional monomer being selected from the group consisting of (meth) acrylates, hydroxy(meth)acrylates, alkoxy (meth)acrylates, (meth)acrylamides, aminoalkyl(meth)acrylates, pyrrolidones, and combinations thereof.

5. The solid electrolytic capacitor of claim 1, wherein the latex polymer is poly[(styrene-co-ethylene glycol)methacrylate].

6. The solid electrolytic capacitor of claim 1, wherein the conductive polymer contains a polypyrrole, polythiophene, polyaniline, polyacetylene, poly-p-phenylene, polyphenolate, or a combination thereof.

7. The solid electrolytic capacitor of claim 6, wherein the conductive polymer is a substituted polythiophene.

8. The solid electrolytic capacitor of claim 7, wherein the substituted polythiophene is poly(3,4-ethylenedioxythiophene).

9. The solid electrolytic capacitor of claim 1, wherein conductive polymers constitute from about 0.5 wt. % to about 30 wt. % of the colloidal particle coating.

10. The solid electrolytic capacitor of claim 1, wherein at least a portion of the particles have a core-shell configuration in which the core includes the latex polymer and the shell includes the conductive polymer.

11. The solid electrolytic capacitor of claim 1, wherein at least a portion of the particles include the conductive polymer within a crosslinked network of the latex polymer.

12. The solid electrolytic capacitor of claim 1, wherein the particles have a spherical shape.

13. The solid electrolytic capacitor of claim 1, wherein the solid electrolyte includes a conductive polymer.

14. The solid electrolytic capacitor of claim 1, further comprising an external coating that overlies the colloidal particle coating and contains a carbonaceous layer and a metal layer that overlies the carbonaceous layer.

15. The solid electrolytic capacitor of claim 1, wherein the anode body includes tantalum, niobium, or an electrically conductive oxide thereof.

16. A method of forming a solid electrolytic capacitor, the method comprising:
anodically oxidizing an anode body;

applying a solid electrolyte to the anodically oxidized anode body; and thereafter, applying a colloidal particle coating over the solid electrolyte, wherein the coating is formed from a colloidal dispersion of particles, wherein the particles contain at least one conductive polymer and at least one latex polymer.

17. The method of claim 16, wherein the coating is formed by applying a monomeric precursor for the conductive polymer and the latex polymer to a liquid medium, and thereafter oxidatively polymerizing the monomeric precursor in the presence of an oxidizing agent.

18. The method of claim 17, wherein the liquid medium includes water.

19. The method of claim 18, wherein the liquid medium further includes a secondary solvent in an amount of from about 20 wt. % to about 80 wt. % of the liquid medium.

20. The method of claim 16, wherein the latex polymer is formed from at least one monoethylenically unsaturated monomer.

21. The method of claim 20, wherein the latex polymer is poly[(styrene-co-ethylene glycol)methacrylate].

22. The method of claim 16, wherein the conductive polymer is poly(3,4-ethylenedioxythiophene).

23. The method of claim 16, wherein conductive polymers constitutes from about 0.5 to about 30 wt. % of the colloidal particle coating.

24. The method of claim 16, wherein at least a portion of the particles have a core-shell configuration in which the core includes the latex polymer and the shell includes the conductive polymer.

25. The method of claim 16, wherein the solid electrolyte includes a conductive polymer.

* * * * *